United States Patent [19]

Mazelsky

[11] 4,423,848

[45] Jan. 3, 1984

[54] CRASHWORTHY HELICOPTER SEAT

[75] Inventor: Bernard Mazelsky, West Covina, Calif.

[73] Assignee: Ara, Inc.

[21] Appl. No.: 192,958

[22] Filed: Oct. 1, 1980

[51] Int. Cl.³ ............................................. B64D 25/04
[52] U.S. Cl. .................................. 244/122 R; 297/216
[58] Field of Search ....... 244/122 R, 122 AG, 138 R; 188/372–376; 297/216; 74/492

[56] References Cited

U.S. PATENT DOCUMENTS 3,369,634 2/1968 Mazelsky ........................... 188/372
4,150,805 4/1979 Mazelsky ........................ 244/122 R

OTHER PUBLICATIONS

Mason Reilly, "Crashworthy Troop Seat Investigation", USAAMRDL—TR—74—93, Dec. 1974, pp. 53–88, 124–166.

*Primary Examiner*—Galen L. Barefoot
*Attorney, Agent, or Firm*—Herzig and Walsh Incorporated

[57] ABSTRACT

An improved helicopter seat primarily for combat aircraft includes at least upper, intermediate, and lower pairs of energy absorbers attached between the seat bucket and the frame of the helicopter and operable in both tension and compression. An upper pair and lower pair of steel tension rods attached between the frame and the seat bucket provide attentuation in a lateral direction. The energy absorbers comprise a plurality of telescoped tubes interfitted into one another and having coils of wire frictionally engaged between adjoining tubes such that energy is dissipated by motion of the tubes relative to one another through the plastic deformation of the coils of wire. The energy absorbers are adjusted to optimize the safety parameters of occupants of the seat under a range of potential crash conditions including the most probable crash condition, and for occupants having a substantial range of weight.

15 Claims, 11 Drawing Figures

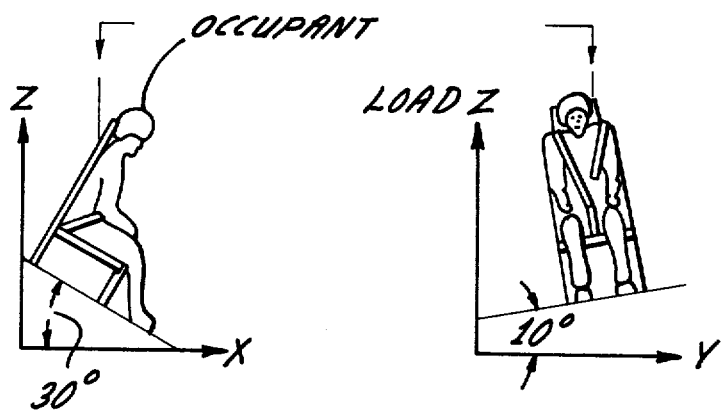
Fig. 1A
Fig. 1B
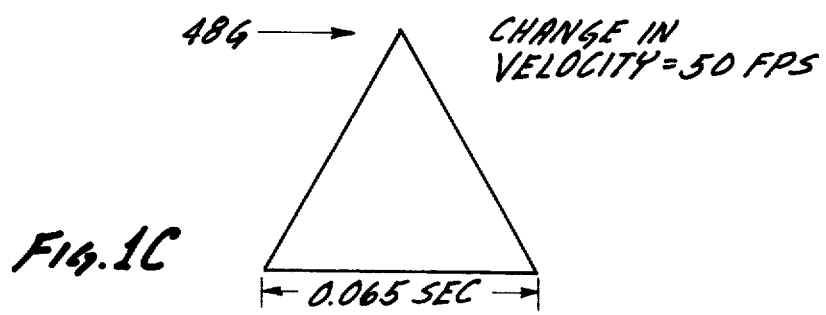
Fig. 1C

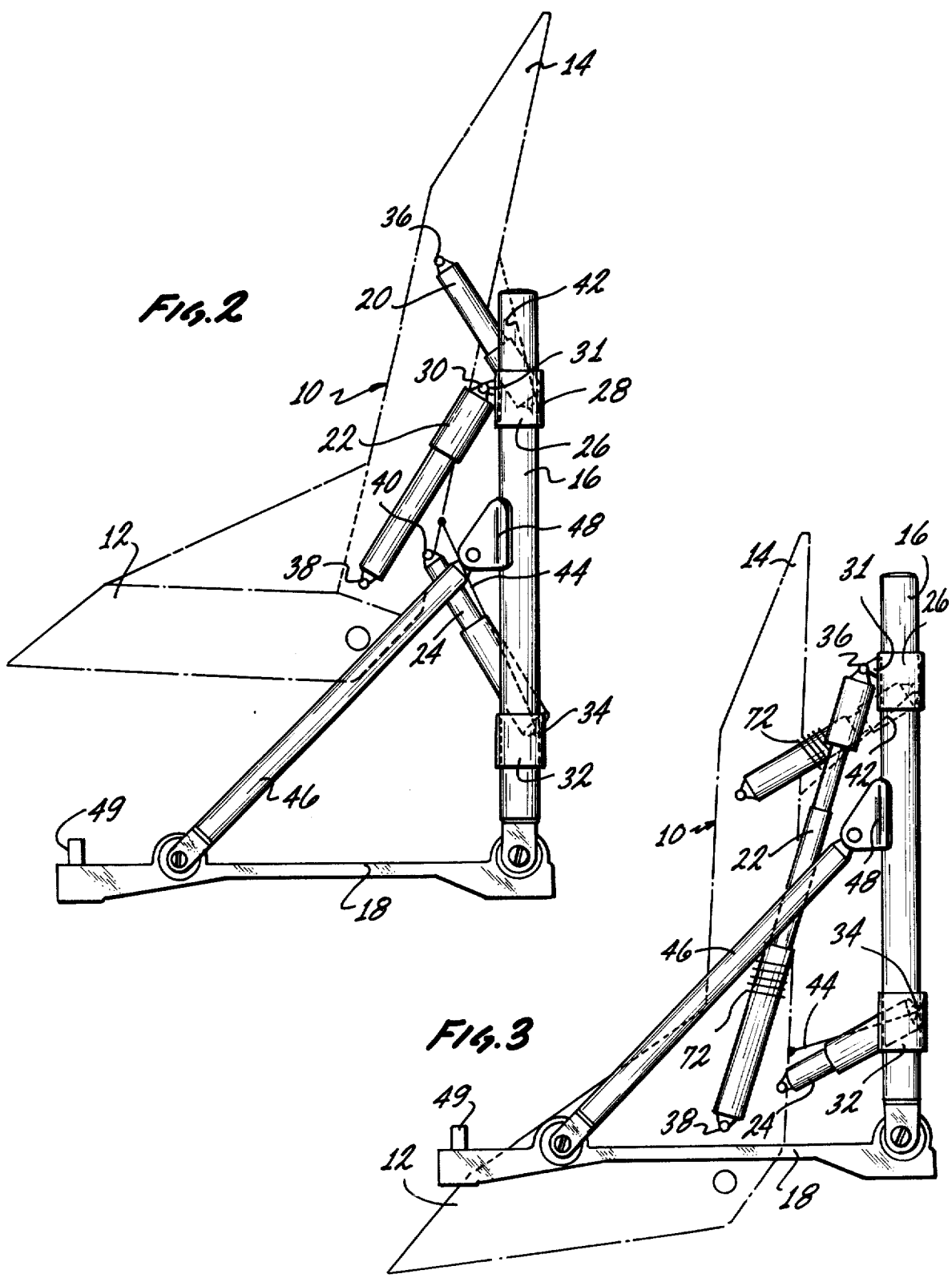

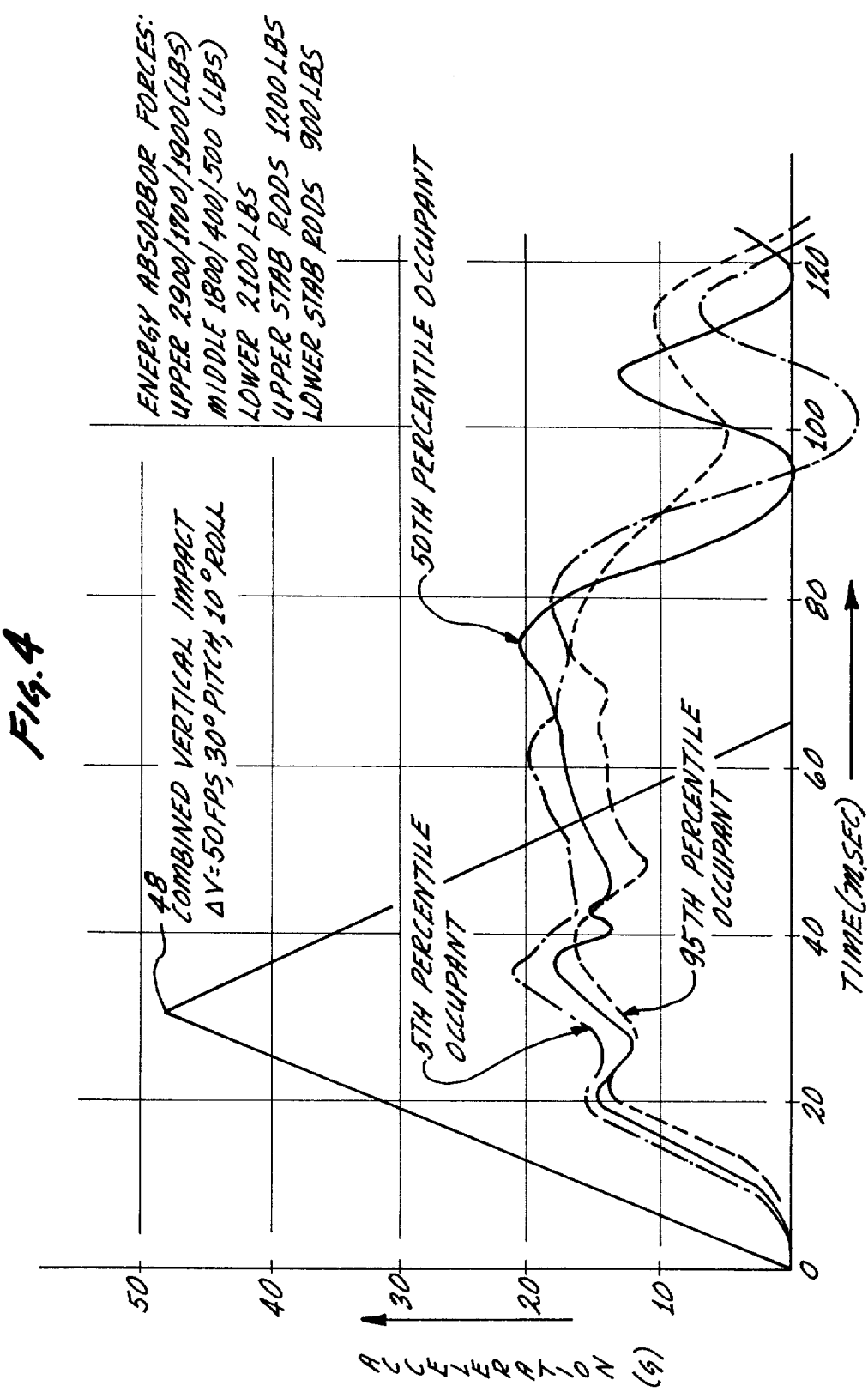

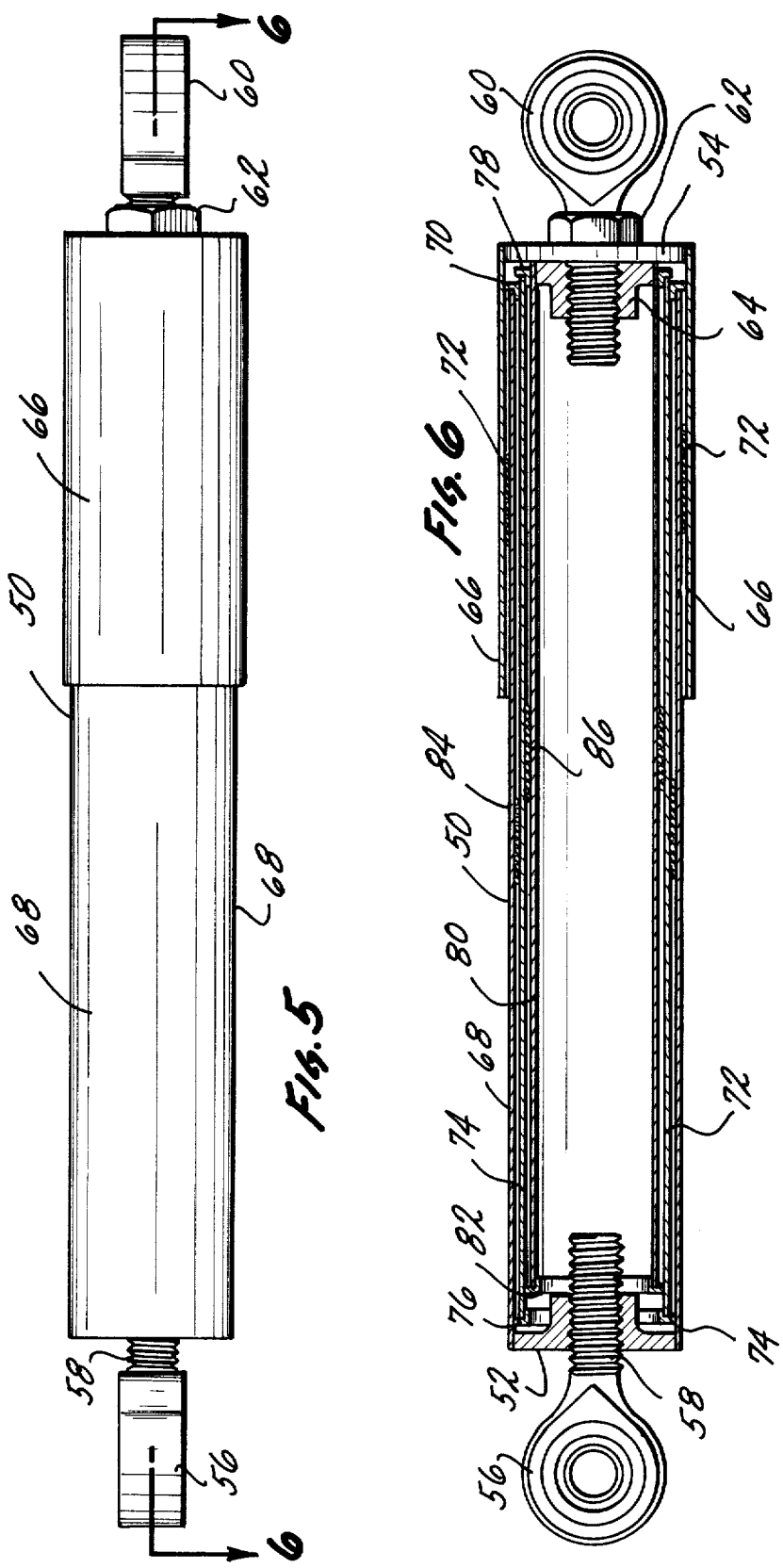

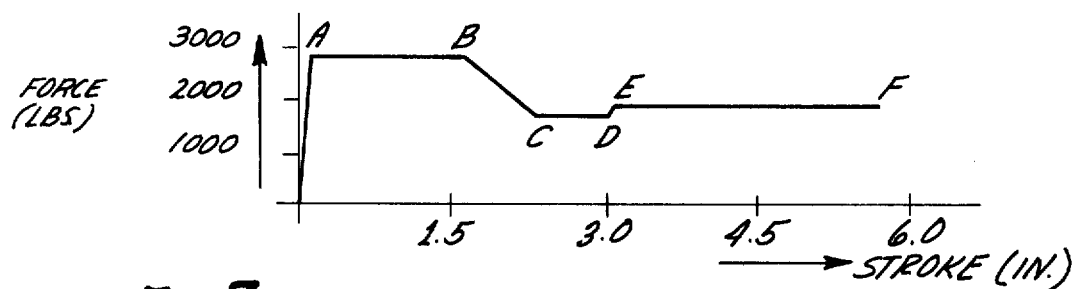
FIG. 7 UPPER ENERGY ABSORBER MEANS
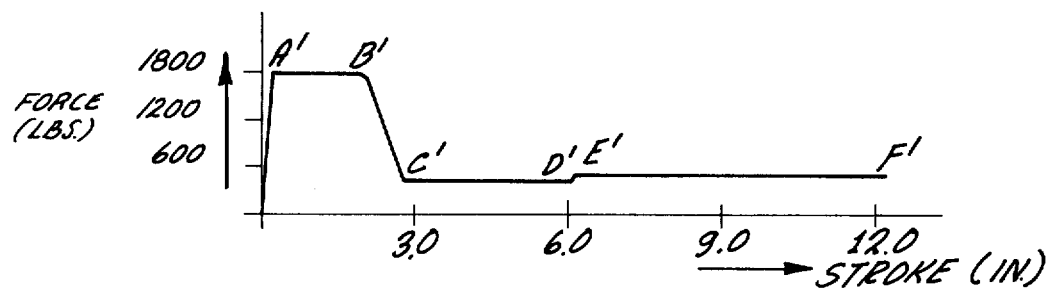
FIG. 8 INTERMEDIATE ENERGY ABSORBER
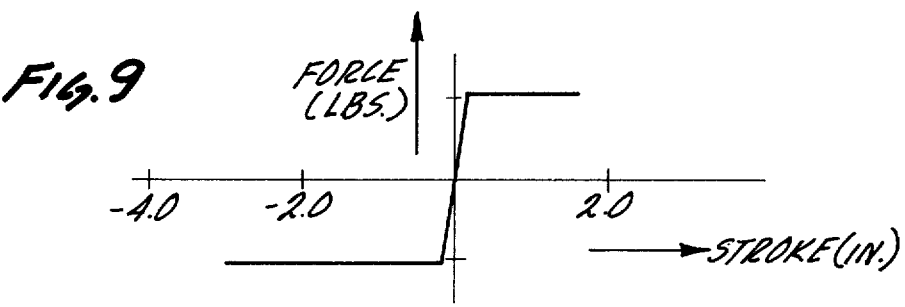
LOWER ENERGY ABSORBER

CRASHWORTHY HELICOPTER SEAT

CROSS-REFERENCE TO RELATED APPLICATIONS

Applicant hereby incorporates by reference the subject matter disclosed in U.S. Pat. No. 3,369,634 and U.S. Pat. No. 4,150,805, both to Applicant.

BACKGROUND OF THE INVENTION

1. Field of the Invention

The invention relates to crashworthy seats for use in aircraft, particularly helicopters.

2. Description of the Prior Art

The recent sharp increase in military and civilian use of helicopters has induced a concurrent need for improved means for protecting the safety of occupants, particularly in a military context, under crash conditions. Substantial research has been accomplished on the nature of helicopter crashes, and particular attention has focused upon the subject of defining a single crash pulse most accurately representing the most probable type of crash for helicopter type aricraft. A particular pulse shape has been discerned and has been accepted by virtually all military agencies in the United States. Thus, it is this shpe which must be met in providing safety for occupants of helicopter seats, under crash conditions.

Besides meeting the requirements of the most probable crash pulse referred to above, further requirements of an effective crashworthy helicopter seat include safety for users having a range of body weight. Studies have indicated that the maximum tolerable deceleration along the human spine for appreciable time intervals, i.e., 0.006 second, is approximately 23 g's. Under a vectorial analysis of the accepted most probable crash plane, the main velocity vector is that identified along the spine of the occupant. Such a crash pulse at an impact velocity of 50 feet per second will cause a peak deceleration of approximately 48 g's. This is substantially higher than the maximum tolerable deceleration. Since force levels in energy absorber elements are fixed at prescribed levels, "g" values experienced will increase with decrease of weight of the occupant of the seat. Because operating distance for energy absorber elements in aircraft is fixed, force levels in existing energy absorbers are determined by the available operating distance in the aircraft for attenuating for the largest occupant weight without permitting the seat to contact the floor of the aircraft with appreciable velocity. This has the effect of penalizing lighter weight seat occupants subjecting them to possible injury or death in crashes from persons of greater body weight would emerge relatively uninjured.

Thus, there has been a felt but unfulfilled need for a crashworthy helicopter seat having optimized force-displacement characteristics to accommodate occupants of varying weight and to adapt to a range of crash pulses, particularly that of the most probable type.

SUMMARY OF THE INVENTION

A crashworthy helicopter seat comprises a seat member including a back section and a seating section, energy absorbing means connected between the seat member and the frame of the helicopter, the energy absorbing means including upper energy absorber means connected between the seat back section and the frame of the aircraft, and further including intermediate energy absorber means connected between the seat back section and disposed between the upper energy absorber means and the floor of the aircraft. The energy absorber means further include lower energy absorber means attached between the seat back section and the frame of the aircraft and disposed between the intermediate energy absorber means and the floor of the aircraft. The upper energy absorber means and the intermediate energy absorber means are adapted to absorb energy in connection with motion thereof induced by a crash in a first stage and a second stage, the energy being absorbed in the first stage at a higher level of force and at a lower level of force in the second stage.

BRIEF DESCRIPTION OF THE DRAWINGS

FIG. 1A depicts in schematic fashion motion of a helicopter seat under crash conditions with respect to a particular crash pulse velocity vector;

FIG. 1B depicts in schematic fashion motion of a helicopter seat along an additional crash pulse velocity vector;

FIG. 1C depicts in schematic fashion deceleration experienced by a helicopter seat under crash conditions;

FIG. 2 is a schematic side elevation of a crashworthy seat in accordance with the invention, in a pre-impact configuration;

FIG. 3 is a schematic side elevation of a crashworthy seat in accordance with the invention in a post-impact configuration;

FIG. 4 is a graph of acceleration versus time response to a crash of the crashworthy seat depicted in FIG. 2 for a range of occupant body weights.

FIG. 5 is a perspective view of an energy absorber having optimized force - displacement characteristics in accordance with the invention;

FIG. 6 is a sectional view of the energy absorber of FIG. 5 along the line 6—6;

FIG. 7 is a graph of force - displacement characteristics of an energy absorber employed at an upper position in conjunction with helicopter seats in accordance with the invention;

FIG. 8 is a graph of force- displacement characteristics of an energy absorber used in an intermediate position in conjunction with helicopter seats in accordance with the invention; and FIG. 9 is a graph of force - displacement characteristics of an energy absorber employed in a lower position in helicopter seats in accordance with the invention.

DETAILED DESCRIPTION OF A PREFERRED EMBODIMENT

As depicted in FIGS. 2 through 4, inclusive, a crashworthy helicopter seat includes a seat bucket member 12 and a seat back plate 14. The disclosure in U.S. Pat. No. 4,150,805, incorporated by reference herein, describes in detail many of the features of the crashworthy seat and its attachment to the aircraft. Thus, only a brief description of matters disclosed in the issued patent will be discussed herein. For sake of simplicity and clarity, various straps and buckles—not part of the invention—for securing the occupant into the seat are not shown. The seat bucket 12 and the seat back plate 14 are integral and are attached to a vertical column 16 which in turn is attached to a rail guide 18. Rail guide 18 is attached to a rail (not shown) which is in turn attached to the frame of the helicopter. A second vertical column (not shown) is symmetrically disposed with respect to, and attached to, the seat 10 in the same manner as column 16.

At an upper portion of the seat back plate 14, a symmetrically arranged pair of energy absorbers 20 are attached between the seat back plate 14 and the vertical column 16. The arrangement of the pair of energy absorbers 20 (only one of which is shown in the side elevation depicted) is symmetrical with respect to the seat back plate 14 in that they are disposed at an equal distance around a vertical center line of the seat back and at the same vertical distance from the seat bucket member 12.

A pair of intermediate energy absorbers 22 are attached between the seat back plate 14 and the column 16. As described hereinabove with respect to energy absorbers 20, only one of the energy absorbers 22 is depicted. The intermediate energy absorbers 22, like the upper energy absorbers 20, are disposed symmetrically with respect to the seat back plate in that they are equidistant from the vertical center line thereof and equidistant from the seat bucket 12.

Lower energy absorbers 24 are attached between seat back 14 and column 16. As in the case of the upper and intermediate energy absorbers 20, 22, lower energy absorbers 24 are disposed symmetrically with respect to the seat back 14. (Only one energy absorber 24 is depicted in the figures).

Attachment of the upper and intermediate enegy absorbers 20, 22 to the column 16 is at a collar 26 disposed on column 16. Attachment to collar 26 of energy absorbers 20, 22 is at ball joints 28, 30, respectively, on said energy absorbers. Ball joints 28 are secured to a socket receptacle (not shown) affixed to the collar 26 by means of pins (not shown). Ball joint 30 is attached to collar 26 by a socket receptacle 31 by a pin (not shown). Affixation of lower energy absorber 24 to column 16 is by means of a collar 32 through a ball joint 34 on energy absorber 24, in the same manner as energy absorbers 20, 22 are affixed to collar 26.

Attachment of the energy absorbers 20, 22, 24 to the seat back plate 14 is achieved in the same fashion as is attachment of the respective energy absorbers to the column 16, and such attachment is effected at ball joints 36, 38, 40, respectively on said energy absorbers 20, 22, 24.

A pair of upper lateral stabilizing rods are attached between the seat back 14 and the column 16 at collar 26. A pair of lower lateral stabilizing rods 44 (only one of which is shown) are attached between collar 32 and the seat back 14. The lateral stabilizing rods 42 are in a crisscross configuration such that the stabilizing rod 42 which is attached to column 16 is affixed at the opposite side of seat back plate member 14 and the stabilizing rod 42 which is affixed to the side of seat back plate member 14 which is at the same side as column 16 is affixed to the counterpart column of 16 which is not shown. Similarly, the lateral stabilizing rods 44 are in a crisscross configuration. Stabilizing rods 42, 44 are attached to the seat back plate 14 and the respective collars 26, 30 by pivotable attaching means in the same manner as the energy absorbers are attached. A diagonal brace 46 is pivotably attached between a clevis 48 affixed to column 16 and rail guide member 18 to provide further stabilization for the seat 10. A similar diagonal brace (not shown) is disposed symmetrically at the opposite side of the seat 10 from brace 46.

Rail guide 18 is movable along a rail (not shown) for the purpose of adjusting the position of the seat. A pin 49 affixes the rail guide in position as desired by the occupant of the seat.

The configuration and structure of energy absorbers 20, 22, 24 are best seen in FIGS. 5 and 6. Since the structure of energy absorbers 20, 22, 24 is the same, with the only variation being certain parameters of certain of the elements thereof, the description and discussion herein shall be applicable to all of the energy absorbers unless otherwise stated. An energy absorber 50 has end pieces 52, 54 at its left and right ends, respectively. A ball joint 56 is attached to end piece 52 at the end of a threaded bolt 58 which threadably engages the end piece 52. A ball joint 60 is secured to end piece 54 by threadably engaging a nut 62 and an inner end piece 64 rigidly attached by welding to end piece 54.

An outer cylindrical tube 66 is welded to end piece 54. A first intermediate tube 68 is welded to end piece 52 and is disposed to be partially contained within, and to extend out from tube 66. A ring 70 is attached to the righthand end of tube 68 that is, the end which is disposed within the tube 66. A helical coil 72 of wire is frictionally engaged between the inner surface of tube 66 and the outer surface of tube 68. A detailed description of the construction of energy absorbers employed in conjunction with the invention is provided in the aforementioned U.S. Pat. Nos. 4,066,149 and 3,369,634, which patents are incorporated herein by reference. Thus, only those matters will be described herein which vary from the earlier disclosure and common subject matter will be described briefly.

Coil 72 is preferably a solid, non-elastomeric, normally uncompressed body, with each turn constituting an arcuate body adapted to be subjected to cyclical plastic deformation in tension and compression when the turn is rotated about its internal axis, which is the tube 68.

A second intermediate tube 74 is disposed inwardly of tube 68 and is partially contained within the volume occupied by outer tube 66. A ring 76 at the lefthand end of tube 74 is in frictional engagement with tube 68. A ring 78 is disposed at the righthand end of tube 74 within the volume occupied by tube 66; rings 76, 78 are affixed to tube 74 by welding. It should be noted that tube 74 is not attached to either end piece 52, 54 and is thus a "floating" tube.

An inner tube 80 is rigidly attached as by welding, to inner end piece 64. A ring 82 is rigidly secured to the end of inner tube 80 opposite its attachment to end piece 64.

An intermediate coil 84 is disposed between and in frictional engagement with first intermediate tube 68 and second intermediate tube 74. Coil 84 is of the same character as coil 72 except that its parameters, including number of turns will vary to achieve a desired result in terms of performance of the energy absorber under crash conditions. A third coil 86 is disposed between tube 66 and tube 68 and is frictionally engaged with said tubes. Coil 86 is of similar character to coils 72, 84 with changed parameters, including number of turns, to vary its performance to achieve a desired result in terms of performance. In a particular application described herein, in energy absorber 20, coil 72 has eight (8) turns composed of steel wire. Coil 84 is composed of twelve (12) turns, and coil 86, of thirteen (13) turns. All of the coils 72, 84, 86 are helical and constitute arcuate bodies adapted to be subjected to cyclical plastic deformation in tension and compression when their turns are rotated about their internal axes. In a further specific application herein, comprising energy absorber 22, coil 72 has ten (10) turns, coil 84 has three (3) turns and coil 86 has four (4) turns.

FIGS. 7 through 9, inclusive, depict in graphic form operation of the energy absorbers used in conjunction with the invention. The energy absorbers 20, 22 comprise absorbers which are constructed in the manner of the energy absorber described and depicted in connection with FIGS. 4 and 5. Lower energy absorber 26 is constructed in accordance with the disclosure in prior U.S. Pat. No. 3,369,634 which differs from the structure depicted and described in connectin with FIGS. 4 and 5 in that the floating intermediate tube 68 is not present and in that there is only one, as opposed to three coils. The energy absorber 26 works in both tension and compression during impact, as depicted in FIG. 9. In a specific application described herein, energy absorber 26, the coil disposed between the outer and inner tubes comprises fourteen (14) turns. The outer and inner tubes of energy absorbers 20, 22 are initially set to be displaced relative to one another so that in their initial operation, energy absorbers 20, 22 can operate either in tension or compression, thus accommodating to the entire spectrum of crash conditions. This is in contrast to the upper and intermediate energy absorbers which are connected between the seat and the frame such that initial operation will be in tension only operation in compression resulting only from impact of the seat with the floor of the aircraft.

Operation of lower energy absorber 26 is as described in the prior U.S. Pat. No. 3,369,634. Upper energy absorber 20 and intermediate energy absorber 22 operate as follows in the example given, which is that of operation in tension. Operation in compression is, of course simply the reverse of that in tension. For simplicity, it will be assumed that the energy absorber 50 is fixed at its left end and that it is being pulled to the right through ball joints 60. Initially, when the applied tension load reaches a force level which is identified in FIGS. 7 and 8 as "A", "B", "A'" and "B'", respectively, the end piece 54 commences motion under the influence of such force. As a result tube 66 which is attached to end piece 54 moves to the right. Inner end piece 64 which is secured to end piece 54 moves together with the latter, thereby drawing to the right inner tube 80. Because the force constant of coil 86 is greater than that of coil 84, the floating tube 74 moves together with inner tube 80 rightwardly under the influence of a tension load. In connection with the motion of the tubes referred to above, coils 74, 84 begin to roll simultaneously. The sum of the forces exerted by coils 72, 84 is equal to the A, B, and A', B' forces of the upper and intermediate energy absorbers 20, 22, respectively.

At the end of the A, B, and A', B' displacements or strokes (the term "stroke" will be used interchangeably with the term "displacement" in describing the motion of energy absorbers herein), the coil 72 will emerge from between tubes 66 and 68 as the tube 66 retracts further and further to the right and moves relative to tube 68. As the coil 72 is emerging from between the tubes 66, 68 and is unraveling the stroking force will decrease uniformly until coil 72 is totally disengaged. This occurs in the regions designated "B", "C" and "B'", "C'", respectively, for upper and intermediate energy absorbers 20, 22. At the point C and C', the force is reduced to that which is produced by the coil 84 by itself. The coil 72 remains on tube 68 and moves loosely thereon, without affecting any further operation of the energy absorber.

As the tension force continues, and stroking continues, the force remains that of coil 84 in the regions B, C and B', C'. This situation continues to exist until the position of tube 74 with respect to that of tube 68 is such that ring 76 contacts coil 84, at which point the space for stroking of the latter coil is eliminated. Further motion of tube 74 causes a small bending deformation of coil 84 which produces an increased force reflected in the intervals D, E and D', E'. At points E, F', displacement then continues between inner tube 84 and second intermediate tube 74, and coil 86 initiates rolling movement. The force level of coil 86 is lower than that of the combined force levels of coils 72, 84 and higher than that of coil 84 operating independently. The force corresponding to point E continues to be exerted during the interval E, F, as does the force corresponding to E' during the interval E', F'. This continues until the space between tubes 80 and 74 terminates with the contact of ring 82 with coil 86, which occurs at points F and F'. At this point, a "bottoming out" force of the motion of the inner tube 80 against the resistance of coil 86 is exerted. The length of the total displacement or stroke of the upper and intermediate energy absorbers is set to exceed the distance between the initial point of the helicopter seat and the floor of the aircraft, so that at any time during crash-induced motion, restraint is provided by energy absorbers.

At any point in the cycle described hereinabove, the energy absorbers can operate in compression as well as in tension in a reverse fashion to that described for motion under the effect of tension forces. This is due to the fact that the forces and motions are symmetrical and that the coils operate equally efficiently for motion in one direction or the other. The only exception to the symmetry of the operation of the energy absorbers is that the coil 72 will, of course, not operate in compression after it has become disengaged from its space between tubes 66 and 68. This, however, presents no problem with respect to performance of energy absorbers and crashworthy seats in accordance with the invention. A motion in compression following motion under tension would correspond to a "bounce" or rebound of the helicopter seat from a collision with the floor of the aircraft. The energy of rebound from such a collision is, obviously, far less than that of the initial crash-induced motion, and thus the ability of the energy absorbers to operate in tension and in compression with the remaining coils 84, 86 is sufficient to safeguard the occupant of the seat.

The "most probable crash pulse" referred to hereinabove is depicted in FIGS. 1A, 1B and 1C, in terms of motion of a schematically depicted chair and occupant under crash conditions. Such motion comprises a forward "tilted" motion at an angle of approximately 30° to the floor of the aircraft, constituting a "pitch". An additional motion is lateral, constituting a "roll" at an angle of substantially 10°. A peak deceleration comprises a change of velocity of 50 feet per second over 0.065 seconds, for a peak acceleration substantially equal to 48 times the acceleration of gravity, or 48 g's.

As is seen in FIGS. 2 and 3, and as graphically depicted in FIG. 4, motion of the seats in accordance with the invention under the influence of crash conditions is depicted in graphical form in FIG. 4 and in terms of displacement of the structure in FIGS. 2 and 3. The primary displacement of the seat is, of course, downwardly in a "pitching" motion. Rolling (i.e., sideward or lateral motion) is attenuated by tension rods 42, 44. Forward and downward motion, which comprises the major component of crash-induced movement, is depicted in FIGS. 2 and 3. In the post-impact configuration of FIG. 3, the upper and intermediate energy absorbers 20, 22 have the coils which were initially in place between the inner and first intermediate tubes loosely moving on the outer tubes, the energy absorbers having stroked to the extent that the outer and intermediate tubes were displaced from one another such that the spring initially disposed between them was displaced. The seat bucket member 12 is depicted as being below the level of rail guide 18 since in particular applications where desired there may be a depression in the floor of the aircraft to accommodate a longer motion of the seat for purposes of providing greater restraint on crash-induced motion of the seat. The tension rods 42, 44 are depicted as intact. The rods 42, 44 may either elongate or break with respect to restraining motion under crash conditions but are fabricated so that they will restrain motion of the seat bucket member 12 and seat back plate 14 under all survivable crash conditions.

The response under crash-induced conditions of lower energy absorbers 26, which operate in both tension and compression, as noted above, is as described in the previously issued U.S. Pat. No. 3,369,634. The total response of the seat under the influence of the individual responses of the energy absorbers and the tension rods for the most probable crash conditions referred to hereinabove, namely, a combined vertical impact with a 50 feet per second deceleration, a 30 degree pitch, and a 10 degree roll, is depicted in FIG. 4. As shown in the figure, the response of a helicopter seat in accordance with the invention provides safety to occupants of a broad range of body weight. For example, the fifth weight percentile occupant (the graph of which is in phantom), whose weight is approximately 150 pounds, at all times remains below the maximum tolerable stress limit of 23 g's deceleration. The graph is for the situation in which the upper energy absorber 20 forces at the A, B range are 2900 pounds, at the C, D range are 1700 pounds, and at the E, F range are 1900 pounds. The intermediate shock absorber 22 corresponding forces are 1800, 400, and 500 pounds, respectively. The lower energy absorber 26 forces are 2100 pounds. In the same arrangement, forces of the upper stabilizing rods 42 are 1200 pounds, and those on the lower stabilizing rods 44, 900 pounds. These forces can be achieved by suitable adjustment of the tubes and coils in the energy absorbers utilizing the specific parameters of the elements of the energy absorbers referred to above. Specific parameters for energy absorbers utilized in accordance with the invention may vary with the specific anticipated level of crash intensity for which the crashworthy seat is to be employed; however, the inter-relationships among the force levels of the particular energy absorbers involved in the invention will have similar proportions to those in the specific example given herein.

In contrast to existing systems, the fifth percentile occupant is safeguarded virtually equally effectively to the ninety-fifth body weight percentile occupant, the latter having a weight of approximately 225 pounds. The graph for the motion of ninety-fifth percentile occupant is in broken lines. The fiftieth body weight percentile occupant (the graph for whom is in solid line), like the fifth and ninety-fifth percentile occupants, is safeguarded such that the maximum tolerable vertical stress on the spine is not inflicted on such an occupant. In existing systems, the lighter (e.g., fifth percentile) occupant is penalized by the energy absorbing force levels such that for a typical existing system, the heavier occupants will not experience intolerable g levels whereas the fifth percentile occupant could be required to undergo such damaging deceleration. The above-described performance characteristic of energy absorbers used in connection with the invention provides a response of the helicopter seat to crash conditions which is such that the occupant of lighter body weight is provided with equivalent protection to that received by occupants of higher body weight. This is a consequence of the fact that the upper and intermediate enrgy absorbers 20, 22, having a higher force level of operation initially as opposed to later in the stroking cycle, dissipate more energy during the initial stage of the impact, thus affording an improved distribution of dissipated energy. Under the improved energy distribution, the time occurrence of peak decelerations differs substantially for the three examples of occupant weights with the result that the peak accelerations are roughly equivalent for the three examples. This performance characteristic of the invention avoids the necessity of providing a complex and error-prone system for adjusting parameters of helicopter seats to adapt to occupants of various body weights or, in the alternative, requiring occupants of lighter body weight to accept a greater risk of death or serious injury than heavier occupants.

Though a particular embodiment of the invention has been described and depicted herein, the invention is defined solely by the appended claims interpreted in light of the specification.

What is claimed is:

1. A crashworthy helicopter seat comprising:
   a seat member including a seat back section and a seating section;
   energy absorbing means connected between said seat member and the frame of said helicopter, said energy absorbing means including upper energy absorber means connected between said seat back section and the frame of said aircraft, intermediate energy absorber means connected between said seat back section and the frame of said aircraft and disposed between said upper energy absorber means and the floor of said aircraft, and lower energy absorber means attached between said seat back section and the frame of said aircraft and disposed between said intermediate energy absorber means and the floor of said aircraft, said upper energy absorber means and said intermediate energy absorber means being adapted to absorb energy in connection with motion thereof induced by a crash, said upper energy absorber means and said intermediate energy absorber means absorbing energy in a first stage following a crash and a second stage following said first stage, said upper energy absorber means and said intermediate energy absorber means each absorbing energy at a higher level of force during said first stage following a crash and at a lower level of force in a second stage following said first stage, the response of said upper energy absorber means to a crash having a force - displacement relationship substantially as shown by the graph in FIG. 7, and the response of said intermediate energy absorber means to a crash having a force - displacement relationship substantially as shown by the graph in FIG. 8, and lower energy absorber means attached between said seat back section and the frame of said aircraft and disposed between said intermediate energy absorber means and the floor of said aircraft, said lower energy absorber means being adapted to absorb energy through motion induced by a crash, said energy absorption being at a force level which is intermediate between the first stage force level of said upper energy absorber means and the first stage force level of said intermediate energy absorber means.

2. A crashworthy helicopter seat comprising:
a seat member including a seat back section and a seating section;
energy absorbing means connected between said seat member and the frame of said helicopter, said energy absorbing means including upper energy absorber means connected between said seat back section and the frame of said aircraft, intermediate energy absorber means connected between said seat back section and the frame of said aircraft and disposed between said upper energy absorber means and the floor of said aircraft, and lower energy absorber means attached between said seat back section and the frame of said aircraft and disposed between said intermediate energy absorber means and the floor of said aircraft, said upper energy absorber means and said intermediate energy absorber means being adapted to absorb energy in connection with motion thereof induced by a crash, said upper energy absorber means and said intermediate energy absorber means absorbing energy in a first stage following a crash and a second stage following said first stage, said upper energy absorber means and said intermediate energy absorber means each absorbing energy at a higher level of force during said first stage following a crash and at a lower level of force in a second stage following said first stage, said lower energy absorber means being adapted to absorb energy through motion induced by a crash, said energy absorption being at a force level which is intermediate between the first stage force level of said upper energy absorber means and the first stage force level of said intermediate energy absorber means.

3. The invention as set forth in claim 2 wherein said upper energy absorber means comprises at least three coil elements and at least four movable elements telescoped within one another such that each of said coil elements is disposed between a pair of adjoining telescoping movable elements prior to a crash of said aircraft, said telescoping movable elements being adapted to be movable under crash conditions of the aircraft and being arranged such that upon initial motion induced by crash of said aircraft, two of said coil elements will roll upon an adjoining movable element, thereby absorbing energy of said crash.

4. The invention as set forth in claim 3 wherein said lower energy absorber means includes at least one coil element and at least two telescoping movable elements telescoped within one another in an initial precrash condition such that each of said coil elements is frictionally engaged between a pair of adjoining telescoping movable elements.

5. The invention as set forth in claim 4 wherein said movable telescoping elements are arranged such that after said first stage of said motion thereof wherein two of said coil elements absorb and dissipate energy, one of said coil elements ceases to absorb and dissipate energy such that the other of said coil elements which absorbed energy during said first stage of motion continues to absorb energy in a second stage of energy absorption, at a lower force level than said first stage of energy absorption.

6. The invention as set forth in claim 5 wherein said coil element other than the two previously mentioned coil elements absorbs energy at a third stage of energy absorption movement, said energy absorption by said latter coil element being at a higher level of force than absorption of energy by said coil element in said second stage of energy absorption but less than the force level of said first stage of energy absorption.

7. The invention as set forth in claim 2 wherein said energy absorbing means are operable to absorb energy in both tension and compression.

8. The invention as set forth in claim 2 further including first energy absorber means operable in tension only and second energy absorber means operable in tension only, said first energy absorber means being attached between said seat back section and the frame of said aircraft and said second energy absorber means being attached between said seat back section and the frame of said aircraft and disposed between said first energy absorber means and the floor of said aircraft, said first energy absorber means and said second energy absorber means being adapted to absorb energy in tension under lateral movement of said seat member.

9. A crashworthy helicopter seat comprising:
a seat member including a seat back section and a seating section;
energy absorbing means including upper energy absorber means, intermediate energy absorber means, and lower energy absorber means, said upper energy absorber means being attached between said seat back section and the frame of said aircraft, said intermediate energy absorber means being attached between said seat back section and the frame of said aircraft and being disposed between said first energy absorber means and the floor of said aircraft, said lower energy absorber means being attached between said seat back section and the frame of said aircraft and being disposed between said intermediate energy absorber means and the floor of said aircraft, said first energy abosrber means being operable to absorb energy of a crash of said aircraft in both tension and compression and in a first and second stage such that absorption of energy in said first stage is at a higher force level than absorption of energy at said second stage, said first stage taking place following a crash of said aircraft and said second stage following said first stage, said intermediate energy absorber means being operable to absorb energy of a crash of said aircraft in both tension and compression and in a first and second stage such that absorption of energy in said first stage is at a higher force level that absorption of energy at said second stage, said first stage taking place following a crash of said aircraft and said second stage following said first stage, said lower energy absorber means being operable to absorb energy of a crash of said aircraft in a first and second stage, said first stage following said crash and said second stage following said first stage, said energy absorption being at a force level which is intermediate between the first stage force level of said upper energy absorber means and the first stage force level of said intermediate energy absorber means, energy absorption by said upper energy absorber means being substantially in accordance with the force - displacement relationship as shown by the graph in FIG. 7, and energy absorption by said intermediate energy absorber means being substantially in accordance with the force - displacement relationship as shown by the graph in FIG. 8.

10. The invention as set forth in claim 9 wherein said upper energy absorbing means comprises at least three coil elements including a first coil element, a second coil element, and a third coil element, and further including at least four elongated movable elements arranged so that each of said coil elements is disposed between a pair of adjoining interfitting movable elements prior to a crash, said coil elements being operable upon relative motion of adjoining movable elements frictionally engaged therewith to absorb energy of a crash at a preselected level of force, said interfitting movable elements being movable under crash conditions to operate said coil elements to absorb energy in a predetermined sequence.

11. The invention as set forth in claim 10 wherein said predetermined sequence of operation of said movable elements includes at least a first stage and a second stage of operation thereof whereby in said first stage immediately following a crash of said aircraft, said first coil element and said second coil element operate concurrently to absorb energy and in a second stage following said first stage, said first coil element ceases to absorb energy and said second coil element continues to absorb energy.

12. The invention as set forth in claim 11 wherein said movable members are movable under crash conditions such that energy is absorbed in a third stage following said second stage of energy absorption, wherein the pair of said movable elements between which said third coil element is disposed move relative to one another such that said third coil element operates to absorb crash induced energy at a preselected force level, operation by said second coil element having terminated therebefore.

13. A crashworthy helicopter seat comprising:
a seat member including a seat back section and a seating section;
energy absorbing means including upper energy absorber means, intermediate absorber means, and lower energy absorber means, said upper energy absorber means being attached between said seat back section and the frame of said aircraft, said intermediate energy absorber means being attached between said seat back section and the frame of said aircraft and being disposed between said first energy absorber means and the floor of said aircraft, said lower energy absorber means being attached between said seat back section and the frame of said aircraft and being disposed between said intermediate energy absorber means and the floor of said aircraft, said first energy absorber means being operable to absorb energy of a crash of said aircraft in both tension and compression and in a first and second stage such that absorption of energy in said first stage is at a higher force level than absorption of energy at said second stage, said first stage taking place following a crash of said aircraft and second stage following said first stage, said intermediate energy absorber means being operable to absorb energy of a crash of said aircraft in both tension and compression and in a first and second stage such that absorption of energy in said first stage is at a higher force level than absorption of energy in said second stage, said first stage taking place following a crash of said aircraft and said second stage following said first stage, said lower energy absorbing means being adapted to absorb energy of a crash of said aircraft in a first and second stage, said first stage following said crash and said second stage following said first stage, said first stage of energy absorption being at a lower force level than the energy absorption in second stage, said upper energy absorber means comprising at least three coil elements and at least four elongated movable elements in the form of at least four hollow tubular members arranged so that each of said coil elements is disposed between a pair of adjoining interfitting tubular members prior to a crash, said coil elements being operable upon relative motion of adjoining tubular members frictionally engaged therewith to absorb energy of a crash at a preselected level of force, said interfitting tubular members being movable under crash conditions to operate said coil elements to absorb energy in a predetermined sequence said at least four hollow tubular members comprising a first hollow tubular member, a second hollow tubular member, a third hollow tubular member, and a fourth hollow tubular member, said first hollow tubular member being attached to a first end piece and having an open end opposite to said first end piece said second hollow tubular member having a portion thereof disposed within said first tubular member prior to a crash of said aircraft, said second tubular member being attached to a second end piece opposite said first end piece, said third tubular member being disposed within said second tubular member in a precrash condition, said fourth tubular member being attached to said first end piece and disposed within said third tubular member in a precrash condition, said first coil element being disposed between and frictionally engaged with said first and second tubular members in a precrash condition, said second coil element being disposed between and frictionally engaged with said second and third tubular members in a precrash condition, and said third coil element being disposed between and frictionally engaged with said third tubular member and said fourth tubular member in a precrash condition, said first coil element being operable to absorb energy at a first force level, said second coil element being operable to absorb energy at a second force level and said third coil element being operable to absorb energy at a third force level, the sum of said first force level and said second force level being greater than said third force level, said predetermined sequence of operation of said tubular members including at least a first stage and a second stage of operation thereof whereby in said first stage immediately following a crash of said aircraft, said first coil element and said second coil element operate concurrently to absorb energy, and in a second stage following said first stage, said first coil element ceases to absorb energy and said second coil element continues to absorb energy, said tubular members being movable under crash conditions such that energy is absorbed in a third stage following said second stage of energy absorption, wherein said third tubular member and said fourth tubular member containing said third coil element are disposed to move relative to one another such that said third coil element operates to absorb crash-induced energy at a preselected force level, operation by said second coil element having terminated therebefore.

14. A crashworthy helicopter seat comprising:
a seat member including a seat back section and a seating section;
energy absorbing means including upper energy absorber means, intermediate energy absorber means, and lower energy absorber means, said upper energy absorber means being attached between said seat back section and the frame of said aircraft, said intermediate energy absorber means being attached between said seat back section and the frame of said aircraft and being disposed between said first energy absorber means and the floor of said aircraft, said lower energy absorber means being attached between said seat back section and the frame of said aircraft and being disposed between said intermediate energy absorber means and the floor of said aircraft, said first energy absorber means being operable to absorb energy of a crash of said aircraft in both tension and compression and in a first and second stage such that absorption of energy in said first stage is at a higher force level than absorption of energy in said second stage, said first stage taking place following a crash of said aircraft and said second stage following said first stage, said intermediate energy absorber means being operable to absorb energy of a crash of said aircraft in both tension and compression and in a first and second stage such that absorption of energy in said first stage is at a higher force level than absorption of energy in said second stage, said first stage taking place following a crash of said aircraft and said second stage following said first stage, said lower energy absorber means being operable to absorb energy of a crash in a first and second stage, said first stage following said crash and said second stage following said first stage, said first stage of energy absorption being at a lower force level than the energy absorption in said second stage, energy absorption by said upper energy absorber means being substantially in accordance with the force - displacement relationship as shown by the graph in FIG. 7, and energy absorption by said intermediate energy absorber means being substantially in accordance with the force - displacement relationship as shown by the graph in FIG. 8, said upper energy absorber means including at least three coil elements including a first coil element, a second coil element, and a third coil element, and further including at least four elongated movable elements arranged so that each of said coil elements is disposed between a pair of adjoining interfitting movable elements prior to a crash, said coil elements being operable upon relative motion of adjoining movable elements frictionally engaged therewith to absorb energy of a crash at a preselected level of force, said interfitting movable elements being movable under crash conditions to operate said coil elements to absorb energy in a predetermined sequence, said predetermined sequence of operation of said movable elements including at least a first stage and a second stage of operation thereof whereby in said first stage immediately following a crash of said aircraft, said first coil element and said second coil element operate concurrently to absorb energy, and in a second stage following said first stage, said first coil element ceases to absorb energy and said second coil element continues to absorb energy, said movable elements including a first hollow tubular body attached to a first end piece and having an open end opposite to said first end piece, and further including a second hollow tubular member having a portion thereof disposed within said first tubular member prior to a crash of said aircraft, said second tubular member being attached to a second end piece opposite said first end piece and having an open end opposite to said first end piece, and further including a second hollow tubular member having a portion thereof disposed within said first tubular member prior to a crash of said aircraft, said second tubular member being attached to a second end piece opposite said first end piece, and further including a third tubular member disposed within said second tubular member in a pre-crash condition, and further including a fourth tubular member attached to said first end piece and disposed within said third tubular member in a pre-crash condition, said first coil element being disposed between and frictionally engaged with said first and second tubular members in a pre-crash condition, said second coil element being disposed between and frictionally engaged with said second and third tubular members in a pre-crash condition, said third coil element being disposed between and frictionally engaged with said third and fourth tubular members in a pre-crash condition, said first coil element being operable to absorb energy at a first force level, said second coil element being operable to absorb energy at a second force level, and said third coil element being operable to absorb energy at a third force level, the sum of said first force level and said second force level being greater than said third force level, said first end piece being movable under forces produced by a crash of said aircraft to cause relative motion of said first tubular member with respect to said second tubular member and relative motion of said third tubular member and said second tubular member whereby said first coil element and said second coil element are operable to absorb energy at a force equal to the sum of the forces at which said coil elements absorb energy separately and wherein said first tubular members configure to disengage with said first coil element after a predetermined length of relative motion between said first tubular member and said second tubular member and wherein said third tubular member includes means for contacting said second coil element after a preselected length of relative movement between said third tubular member and said second tubular member to terminate said relative motion between said second tubular member and said third tubular member.

15. The invention as set forth in claim 14 wherein said fourth tubular member is operable to move relative to said third tubular member upon cessation of relative motion of said third tubular member with respect to said second tubular member and wherein said fourth tubular member contains means for contacting said third coil element to terminate relative movement between said fourth tubular member and said third tubular member after a preselected distance of said relative movement.

* * * * *